United States Patent [19]

Zaplatin et al.

[11] 4,049,490

[45] Sept. 20, 1977

[54] ELECTRODIALYSIS OF BLEACHING EFFLUENT

[76] Inventors: Veniamin Petrovich Zaplatin, ulitsa Tupoleva 20a, kv. 34; Vasily Petrovich Svitelsky, ulitsa Voroshilova 20, kv. 104; Lev Ivanovich Galov, ulitsa Armyanskaya 27, kv. 31; Alla Konstantinovna Djukareva, Artillerii pereulok 3, kv. 22; Rozalia Grigorievna Sklyar, Bulvar Lepse 7, kv. 11; Vasily Alexeevich Denisovich, ulitsa Armyanskaya 27, kv. 30; Dmitry Alexeevich Shirokov, ulitsa Raevskogo 5, kv. 2; Vladimir Alexandrovich Shevchenko, ulitsa Armyanskaya 27, kv. 4, all of Kiev, U.S.S.R.

[21] Appl. No.: 660,496

[22] Filed: Feb. 23, 1976

[51] Int. Cl.$^2$ .................... D21C 9/12; D21C 11/00
[52] U.S. Cl. .................................... 162/37; 8/108 R; 8/108 A; 162/63; 162/66; 162/89; 162/DIG. 8; 204/151; 204/180 P; 204/DIG. 6; 210/22 D
[58] Field of Search ............ 162/19, 37, 40, 63, 162/65, 66, 67, 89, 90, 29, DIG. 8; 8/108 R, 108 A, 111; 204/180 P, 149, 151, DIG. 6; 210/22, 42 R, 59, 60, 65, 70

[56] References Cited

U.S. PATENT DOCUMENTS

| | | | |
|---|---|---|---|
| 1,797,789 | 3/1931 | Patillo | 162/66 X |
| 1,953,191 | 4/1934 | Richter | 162/89 |
| 1,957,938 | 5/1934 | Campbell et al. | 162/89 X |
| 2,120,678 | 6/1938 | Parsons et al. | 162/89 X |
| 2,295,215 | 9/1942 | Joachim | 162/89 |
| 3,074,842 | 1/1963 | Strong | 162/66 |
| 3,148,177 | 9/1964 | Wiley et al. | 204/180 P X |
| 3,472,731 | 10/1969 | Liebergott et al. | 162/89 X |
| 3,909,344 | 9/1975 | Lukes | 162/89 X |
| 3,986,951 | 10/1976 | Fremont | 162/89 X |

FOREIGN PATENT DOCUMENTS

| | | | |
|---|---|---|---|
| 321,282 | 11/1929 | United Kingdom | 162/66 |

*Primary Examiner*—Arthur L. Corbin
*Attorney, Agent, or Firm*—Lackenbach, Lilling & Siegel

[57] ABSTRACT

A cellulose containing vegetable material is bleached by the steps of chlorinating said material, followed by ammonia treatment and post bleaching with washing stages between said steps. Waste waters resulting from the washing stages are purified by subjecting said waste waters to electrodialysis and recovering ammonium chloride from the purified waste waters. The recovered ammonium chloride is used to pre-treat the cellulose material prior to chlorination thereof and the purified waste waters are reused in the washing stages.

3 Claims, 1 Drawing Figure

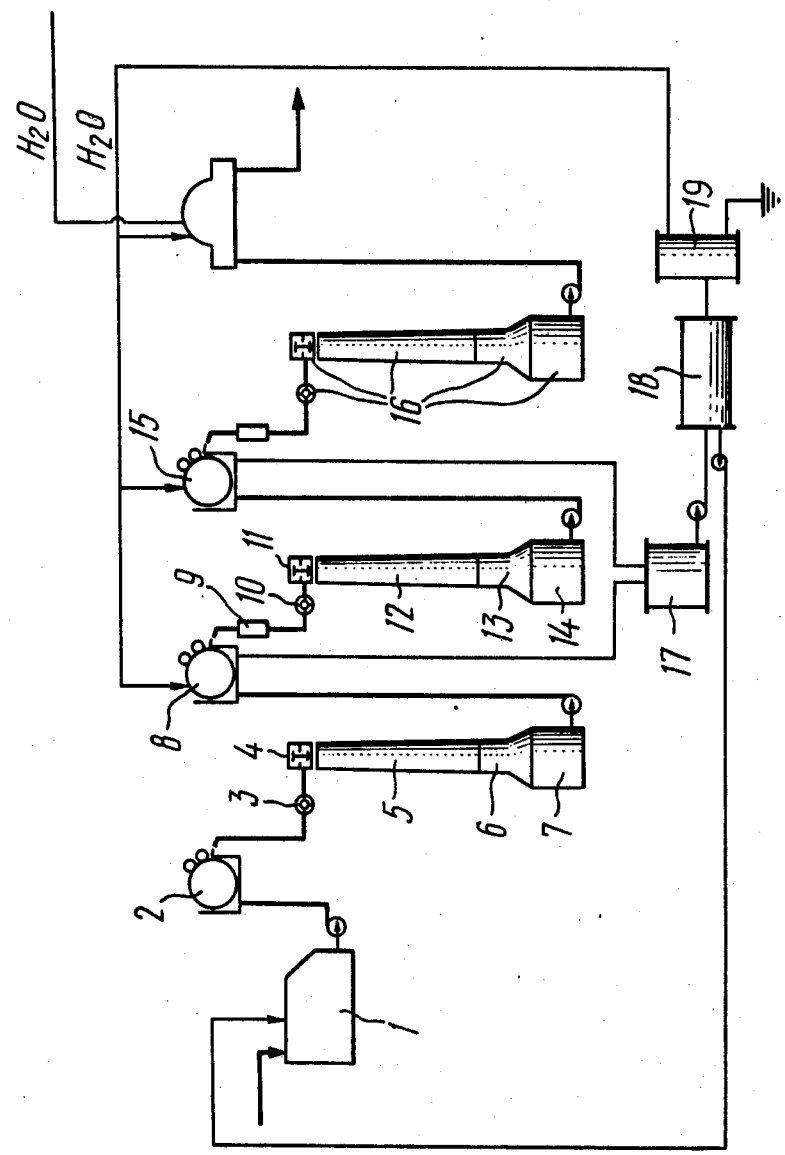

ELECTRODIALYSIS OF BLEACHING EFFLUENT

The present invention relates to processes for bleaching a cellulose-containing vegetable material to produce a bleached pulp employed in pulp and paper industry for the manufacture of various articles.

Known in the art is a process for bleaching a cellulose-containing vegetable material with pulp concentrations ranging from 3 to 12 wt.%. The process comprises chlorination, an alkali extraction and post-bleaching with washing after each stage of the treatment.

These prior art processes consume large quantities of water in the processing steps described. This results in large quantities of polluted water to be disposed. These polluted waters may contaminate water sources while process recovery steps are costly both in time and equipment.

Also known in the art are processes for bleaching a cellulose-containing vegetable material which comprise bleaching a cellulose-containing material at a concentration ranging from 15 to 60 wt.%.

The cellulose-containing material is fed into the first zone containing an excessive amount of chlorine, the mass residence in this zone is restricted in such a manner that it absorbs a lesser amount of chlorine than the possible amount; residence time of the mass in this zone ranges from 20 seconds to 5 minutes, whereafter the floccular mass is continuously passed through the second zone, wherein free chlorine is separated from said mass by means of an air stream; the mass is washed with water and delivered to the stage of alkaline extraction, then it is again washed and the washed fibrous cellulose-containing material is delivered to the post-bleaching stage, whereafter a repeated alkaline treatment is performed, followed by another post-bleaching. It should be noted that after each treatment stage, washing is performed. Washings after each stage of chlorination, alkaline treatment and post-bleaching are drained into a sewerage system.

These prior art processes feature disadvantages residing in great amounts of waste waters containing difficult-to-remove toxic products drained into the sewerage system; increased consumption rate of the reagents due to great losses of chlorine; rather complicated process schemes due to the necessity of removal of the heat evolved during the chlorination reaction; and impossibility to control the reaction temperature.

It is a principal object of the present invention to simplify the process technology.

It is a principal object of this invention to provide simplified technology for the bleaching of cellulosic materials.

It is another object of this invention to change existing technology of draining toxic waste waters by providing a closed cycle enabling the reuse of waste waters.

It is a further object of this invention to simplify process equipment by the elimination of heat exchanger means.

It is yet another object of this invention to improve the quality of cellulose-containing material prior to chlorination by treating said cellulosic material with the agents recovered from the chlorination and alkali treatment steps or from the alkali treatment stage.

The objects of this invention are achieved by using the inorganic compounds recovered from the respective waste waters to treat the cellulosic material prior to chlorination.

It is advisable, in the case of using a cellulose-containing vegetable material with a concentration ranging from 27 to 35 wt.%, to supply liquid chlorine or a mixture of liquid chlorine with gaseous chlorine into the chlorination zone to control the temperature conditions of the chlorination stage. It is preferable to eliminate the residual chlorine by way of purging the vegetable material with an inert gas such as air or nitrogen.

The process for bleaching a cellulose-containing vegetable material in accordance with the present invention is effected in the following manner in accordance with the accompanying flow-sheet.

Into the vegetable material contained in a controlling vessel 1 a calculated amount of ammonium chloride is fed at a start-up moment.

In the case of using, as the starting material, a vegetable material with a concentration of up to 5 wt.%, the mass treated with ammonium chloride is delivered into a mixer, wherein it is mixed with gaseous chlorine, whereafter the mixture is fed into a chlorination column. Duration of the chlorination process is 45 minutes to 1.5 hours. Then the chlorinated pulp mass is washed with water, heated in a steam mixer, mixed with ammonia and supplied into a column for alkali treatment. Duration of the alkali treatment process is 2 to 3 hours. The treated alkaline mass is delivered to washing, then to post-bleaching effected, for example, according to the scheme; $ClO_2 \rightarrow NaOH \rightarrow ClO_2$. Washings after the stages of chlorination and alkali treatment are combined and delivered to separation of the products of interaction of inorganic reagents, for example by a method of electrodialysis. The recovered inorganic products are delivered to the primary treatment of the starting materials prior to the chlorination. Afterwards, the washings are delivered to post-purification, whereafter the purified water is recycled to the process for washing.

In the case of using a concentrated starting material (concentration of from 27 to 35 wt.%) a pulp mass treated in a manner similar to that described hereinbefore, is delivered to a thickener 2, wherein it is concentrated to the content of 27 to 35 wt.%. The thickened mass is fed by a feeder 3 to disintegration into a disintegrator 4, wherein the mass is finely divided to impart a porous structure thereto along with a low density and a highly active surface. The finely divided mass from the disintegrator mounted directly on the column 5 falls into a counter-currently moving stream of a chlorine-air mixture fed into the column. The chlorine-air mixture is circulated over a closed circuit and replenished by the chlorine supply from the outside. Optimal chlorination temperature is 20° to 25° C. The chlorination reaction is accompanied by evolution of heat (470 kcal are evolved per 1 kg of the chlorine adsorbed). To remove this heat, it is advisable that liquid chlorine or a mixture of gaseous and liquid chlorine be supplied into the chlorination zone via appropriate nozzles. Evaporating in the reaction zone, liquid chlorine removes the heat evolved during chlorination of the pulp-containing mass. The pulp-containing mass containing adsorbed chlorine is fed into a residence chamber 6, wherein it is maintained for 1 to 5 minutes. Further, the mass is delivered to a dilution tank 7, wherein it is diluted with water to a concentration of from 1.5 to 5 wt.% and then pumped, by means of a pump, to a washing filter-thickener 8. The washed mass is delivered to a steam mixer 9, wherein it is heated to a temperature within the range of from 90° to 100° C. The heated mass is fed, by means of a feeder 10, to a disintegrator 11 and then to an adsorption column 12, wherein it is treated in a counter-current fashion using an air-ammonia mixture; then it is delivered to a residence chamber 13, wherein it is maintained for 1 to 10 minutes. After said residence, the mass is delivered into a dilution tank 14, wherein it is diluted to a concentration of from 1.5 to 5 wt.% and then pumped to a washing filter - thickener 15. Thereafter, the washed mass is passed to post-bleaching in an apparatus 16 and treated according to the scheme: $ClO_2 \rightarrow NH_3 \rightarrow ClO_2$.

The washings, after the stages of chlorination and alkalinization, from the filters-thickeners 8 and 15 are delivered to a receiver 17, wherefrom they are passed to an electrodialysis apparatus 18, wherein the product of interaction of inorganic components is separated and recycled to the controlling vessel for the primary treatment of the starting vegetable material. Then, the washings are delivered to post-purification 19, whereafter the purified water is recycled to the washing stage of the process.

The use of the process for bleaching a cellulose-containing vegetable material in accordance with the present invention makes it possible to considerably reduce the consumption of water for bleaching, since instead of 200 m³ of water per one ton of the vegetable cellulose-containing material in accordance with the present invention only 25-30 m³ are required; in addition, the process scheme is simplified due to exclusion of a heat-exchanger and a cooling agent. Introduction into the mass, prior to chlorination thereof, of a reaction product of inorganic reagents recovered from the washings resulting from the stages of chlorination and alkali treatment and containing chloride ion prevents the resulting pulp from oxidizing. This makes it possible to improve the quality of the pulp being produced. The process according to the present invention enables a complete elimination of draining toxic waste waters which is of great importance for protection of water sources from pollution.

For a better understanding of the present invention some specific examples illustrating the process for bleaching a cellulose-containing vegetable material are given hereinbelow.

EXAMPLE 1

A cellulose-containing material produced by means of sulphate cooking from aspen wood with a cooking degree of 16.2 Kappa units and viscosity of 1,020 mp (millipoise) pre-treated with a solution of sodium chloride in an amount equal to 2% calculated on absolutely dry mass and with a concentration of 3 wt.% is subjected to chlorination under the following conditions:

| | |
|---|---|
| Active chlorine consumption rate, percent of the absolutely dry mass | 3.3 |
| Temperature, ° C | 18-20 |
| Treatment duration, minutes | 60. |

On completion of chlorination period, the cellulose-containing mass is washed with water until no traces of active chlorine are detected.

Thereafter, the mass is subjected to alkalinization under the following conditions:

| | |
|---|---|
| NaOH consumption rate,% of the absolutely dry mass | 1.6 |
| Mass concentration, wt.% | 10 |
| Temperature, ° C | 60 |
| Final pH value | 10.8 |
| Treatment duration, minutes | 60. |

The mass is further washed and then post-bleached in accordance with the scheme: $ClO_2 \rightarrow NaOH \rightarrow ClO_2$. Post-bleaching conditions are shown in Table 1.

Table 1

| Bleaching stages | Reagents consumption % of abs. dry mass | Concentration of the mass, wt. % | Temperature, ° C | Treatment duration, minutes | final pH value |
|---|---|---|---|---|---|
| Treatment with ClO$_2$ | 1.5 units active Cl$_2$ | 6 | 70 | 180 | 4.25 |
| Alkalinization with NaOH | 0.3 | 10 | 60 | 60 | 10 |
| Treatment with ClO$_2$ | 0.8 units active Cl$_2$ | 6 | 70 | 180 | 5.3 |

The washings after chlorination and alkali treatment are combined and delivered to the apparatus for electrodialysis, wherein the product of interaction of inorganic reagents is separated in the form of a solution of sodium chloride with the concentration of 4 g/l which is used for the treatment of the starting material prior to the chlorination thereof. Regeneration degree (% of regenerated products) of sodium chloride is 89%. Thereafter, further purification of the washings is performed by way of a step-wise lime treatment to a pH value of 12-13 followed by acidification to a pH value of 8-8.5. The purified water is fed to the cellulose containing mass washing after the second treatment with ClO$_2$ and, partially, after chlorination and the first alkali treatment.

The pulp resulting from the post-bleaching has the following characteristics:

| | |
|---|---|
| whiteness | 88.3% |
| viscosity | 840 mp |
| whiteness stabiity | 0.34. |

EXAMPLE 2

A sample of a cellulose-containing material similar to that described in Example 1, pre-treated with a solution of ammonium chloride in an amount equal to 2% of the absolutely dry mass, is thickened to a concentration of 30% by weight, disintegrated to particles with a porous structure and a low density and treated with gaseous chlorine under the following conditions:

| | |
|---|---|
| Active chlorine consumption rate, percent of the absolutely dry mass | 3.3 |
| Temperature, ° C | 18-20 |
| Treatment duration, minutes | 3 |

On completion of the chlorination period the cellulose-containing mass is washed and thickened to a concentration of 30% by weight. After disintegration of the anhydrous mass, it is subjected to alkali treatment by means of an ammonia-air mixture. The treatment is conducted under the following conditions:

| | |
|---|---|
| Ammonia consumption rate, percent of the absolutely dry mass | 0.8 |
| Treatment temperature, °C | 80 |
| pH | 8.9 |
| Treatment duration, minutes | 1. |

The mass is then washed, dehydrated and post-bleached in accordance with the scheme: $ClO_2 \rightarrow ClO_2$. The post-bleaching conditions are shown in Table 2 hereinbelow.

Table 2

| Post-bleaching stages | $ClO_2$ consumption rate, % of active $Cl_2$ | Concentration of the mass, wt.% | Temperature °C | pH | Time Minutes |
|---|---|---|---|---|---|
| 1. $ClO_2$ bleaching | 2.5 | 30 | 30 | 4.2 | 30 |
| 2. $ClO_2$ bleaching | 1.4 | 30 | 70 | 4.6 | 30 |

The washings after chlorination are subjected to purification in a manner similar to that described in the foregoing Example 1. Regeneration degree of ammonium chloride is 91%. The washings after post-purification are recycled to washing as described in Example 1.

The pulp obtained as a result of post-bleaching has the following characteristics:

| | |
|---|---|
| whiteness | 91% |
| viscosity | 810 mp. |

EXAMPLE 3

In a manner similar to that described in the foregoing Example 1, pre-treatment and chlorination of a cellulose-containing mass are performed. After chlorination the mass is purged with air. Then it is subjected to alkali treatment and post-bleaching in a manner similar to that described in Example 2. The washings are subjected to purification as in the foregoing Example 2. Water consumption rate is reduced therewith by 24% as compared to the procedure given in Example 2. The pulp resulting from post-bleaching has the following characteristics:

| | |
|---|---|
| whiteness | 89% |
| viscosity | 790 mp. |

EXAMPLE 4

A sample of a cellulose-containing material is pre-treated in a manner similar to that described in Example 2, whereafter it is thickened to the concentration of 30% by weight, disintegrated to particles with a porous structure and chlorinated under the conditions of Example 2; gaseous chlorine is obtained by evaporation of liquid chlorine supplied into the reaction zone for the purpose of controlling the reaction temperature within the range of from 18° to 25° C. The cellulose-containing material is further washed, subjected to alkali treatment and post-bleaching as in Example 2.

The process eliminates consumption of water as a cooling agent for cooling the chlorine-air mixture circulating within the chlorination apparatus.

The pulp thus prepared has the characteristics similar to those of the pulp obtained in the foregoing Example 2.

What is claimed is:

1. In a process for bleaching a cellulose-containing vegetable material which comprises the steps of chlorinating cellulosic material in a chlorination zone followed by ammonia treatment and post bleaching with washing stages between said steps, the improvement which comprises purifying waste waters resulting from said washing stages by subjecting said waste waters to electrodialysis and recovering ammonium chloride from the purified waste waters, treating said cellulosic material with said ammonium chloride prior to the chlorination step and re-using the purified waste waters in the wash stages thereby providing a closed cycle system and eliminating the drainage of polluted wash waters to natural water sources.

2. A process as claimed in claim 1, wherein during the chlorination treatment of the cellulose-containing vegetable material, having a concentration of from 27 to 35 weight %, liquid chlorine is supplied into the chlorination zone to control the temperature conditions of the chlorinating step.

3. A process as claimed in claim 1, wherein during the chlorination treatment of the cellulose-containing vegetable material, having a concentration of from 27 to 35 weight %, a mixture of liquid and gaseous chlorine is supplied into the chlorination zone to control the temperature conditions of the chlorinating step.

* * * * *